Jan. 31, 1956     S. GUELSON     2,732,848

SAFETY CONTROL DEVICE

Filed March 24, 1953

INVENTOR.
Stanley Guelson, Dec'd.
Ledra C. Guelson, Executrix

By Brown, Jackson, Boettcher & Dienner

ATTORNEYS

United States Patent Office 2,732,848
Patented Jan. 31, 1956

2,732,848

SAFETY CONTROL DEVICE

Stanley Guelson, deceased, late of Milwaukee, Wis., by Ledra C. Guelson, executrix, Whitefish Bay, Wis., assignor to Milwaukee Gas Specialty Company, Milwaukee, Wis., a corporation of Wisconsin Application March 24, 1953, Serial No. 344,397

6 Claims. (Cl. 137—66)

This invention relates to a safety control device.

Devices of this nature are usually installed in places where space is at a premium and, in view of the crowded and highly competitive nature of this field, expense has to be cut to a minimum. Even with these stringent limitations a still more imperative condition cannot be lost sight of. These devices must be eminently reliable and must function, for instance, to cut off the gas in the event of failure of the energizing current as, for instance, upon failure of a pilot burner and the consequent cessation of functioning of the thermocouple associated therewith.

This invention is designed to fulfill all of these requirements and a primary object of this invention is to provide a safety control device such as a small sized automatic gas valve of a capacity of about 35,000 B. t. u. per hour which is reliable in operation, even though it may not be called upon to function for long periods of time, and which is so made that the chance of gumming up the parts with resultant sticking or faulty functioning is greatly reduced.

Further objects are to obtain cheapness of cost of manufacture and extreme compactness while at the same time maintaining or even enhancing the overall reliability of the device.

In one of the better types of safety control devices the practice often followed was to enclose the holding electromagnet and armature in a cylindrical housing or cup-like member which was closed and supported at its rear end and which had the stem of the armature projecting from its front end. The spring for closing the valve upon deenergization of the holding electromagnet was mounted in an exposed manner in front of the housing or cup-like member, and the ferrule which was engaged by forked arms of a manual reset mechanism was also mounted on the stem of the armature in front of the cup-shaped housing and in front of the spring. At the forward end of the armature stem the cut-off valve was mounted. It is apparent that a fairly extensive overall length of device resulted and it was found that the cut-off spring, or valve-closing spring, often became gummed up due to tarry and other gummy substances carried in the gas stream.

It was found that the spring could be housed and well protected from gumming up by enclosing it in a second cup-shaped member or housing which telescoped over the first cup-shaped member or housing for the electromagnet, and that the ferrule, or spool-shaped member could be employed in a twofold manner, viz., to couple the telescoping outer cup-shaped member to the stem of the electromagnet and also to form a part of the cut-off valve itself. In addition, it was found that it was now possible to position the forked arms of the reset mechanism rearwardly and have such arms engage a small peripheral flange formed as a unitary part of the rear marginal edge of the outer telescoping cup-shaped member.

The results of the above construction was to markedly increase the reliability of the safety control device by preventing, or at least greatly minimizing, the possibility of gumming up of the cut-off spring, and to materially reduce the overall length of the device. Further, it was found that the telescoping of the cup-shaped housings for the electromagnet and armature, on the one hand, and for the cut-off spring, on the other hand, had the effect of automatically scraping themselves clear each time the device was manually reset, so as to keep the overlapping surfaces free of gumming, the cut-off spring being at all times protected from gumming by its housing.

A further specific object is to provide a construction in which most of the parts can be formed of stampings, thus greatly reducing the cost of manufacture.

An embodiment of the invention is shown in the accompanying drawing in which.

Figure 1:
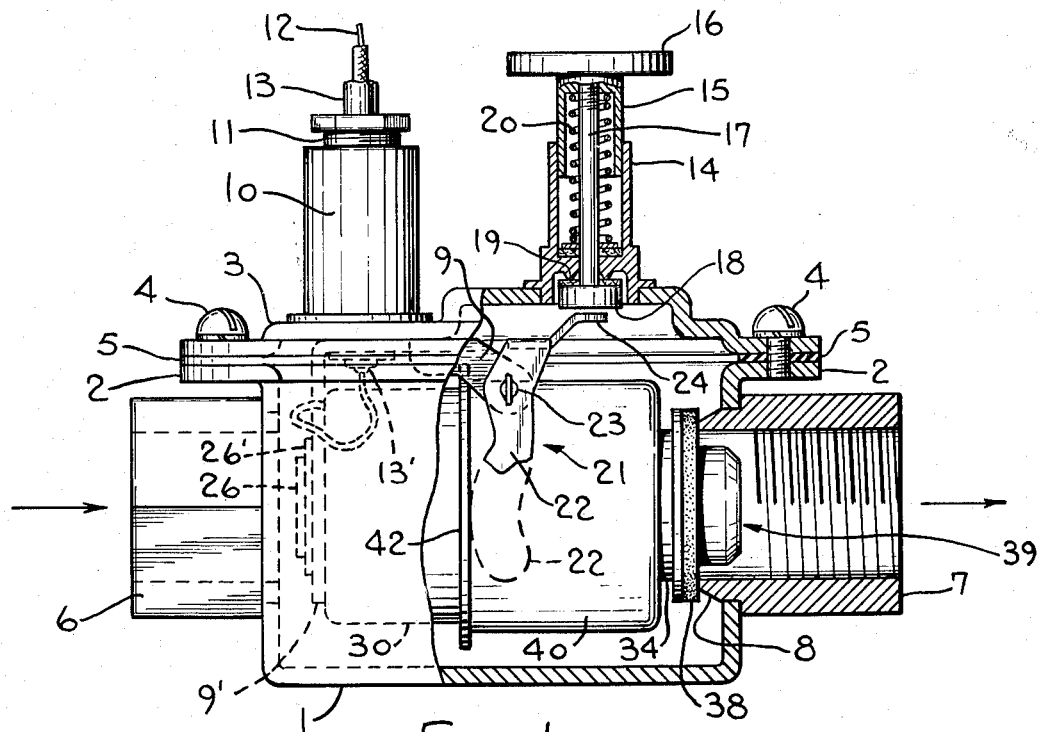
Figure 1 is a side elevation of the device with parts broken away and parts in section with the valve closed.

Referring to the drawings, it will be seen that the device comprises a body portion 1 formed of a rectangular, box-like, stamping and provided with a peripheral, outwardly projecting flange 2 surrounding its upper, open side. The top of the box-like body portion is closed by means of a top 3 formed of a stamping and removably secured by means of screws 4, or in any other suitable manner, a suitable gasket 5 being provided. Preferably the top 3 is slightly bulged, or pressed upwardly as shown. The body portion 1 has a pair of pipe fittings 6 and 7 brazed or otherwise secured thereto and opening into opposite ends thereof as shown. The fittings are preferably polygonal or nut-like on their outer sides, and one of them, for instance the fitting 7 is provided with a valve seat 8 on its inner end and located within the body portion.

A frame 9, formed of a stamping, is brazed or otherwise secured to the under side of the removable top 3. The top also has brazed or otherwise secured thereto a shell 10 forming the female portion of a removable electric coupling whose outer portion is removably screwed thereinto and thus grounded, and whose inner conductor 12 is insulated and connects with the insulating terminal 13', the outer or grounded conductor being the metal tube 13. This construction is well known and is shown in United States Patent No. 2,126,564, of August 9, 1838, issued to Oscar J. Leins for Thermocouple and Lead.

The top 3 also carries the sleeve 14, which is brazed or otherwise secured thereto, and within which is slidably telescoped the hollow stem 15 of a thumb button 16. A stem 17 extends downwardly from the thumb button 16, or manually manipulable member, and terminates in a lower head 18 which is provided with a suitable valve disk arranged to normally seat against a seat 19 formed on the sleeve 14. A spring 20 is located within the telescoping sleeves 14 and 15 and normally holds the thumb button or externally manipulable member 16 in elevated position. The member 16 is the reset member as will be seen hereinbelow.

A bifurcated bell crank lever, indicated generally at 21, has two, downwardly extending arms 22 pivoted as indicated at 23 on the frame 9 and has a horizontally extending arm 24 located below, and operated by the head 18. When the button 16 is depressed, the arms 22 are locked in a clockwise direction.

Figure 2:
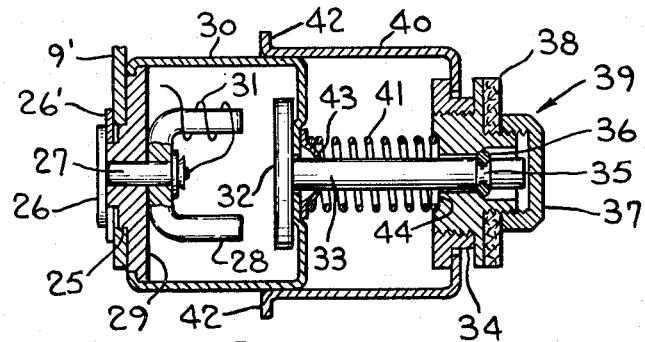
Figure 2 is a detail sectional view of the telescoping cup-shaped housings and the associated parts.

The frame 9 is provided with a downwardly extending arm 9' which is apertured as indicated at 25, see Figure 2, and is adapted to receive the head 26 of a rivet 27 which holds the electromagnet 28 to the rear head 29 of a stationary cup-shaped member 30 which houses the electromagnet and armature. The winding 31 of the electromagnet has one end grounded and the other end connected to the insulated terminal 13'. Preferably a clip 26' locks the head 26 of the rivet to the arm 9' of the frame 9.

Figure 3:
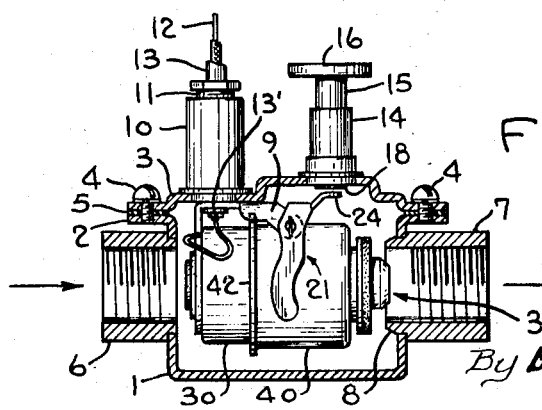
Figure 3 is a view with the outer casing in section and the remaining portions shown in full with the valve open.

The disk-like armature 32 of the electromagnet is loosely carried by the stem 33 which slidably projects from the stationary housing or cup-shaped member 30 and extends into a spool-shaped ferrule 34. The stem has an annular groove 35 which receives the split ring 36 which thus allows the stem 33 to hold the ferrule 34 in its retracted position as shown in Figure 3, when the electromagnet is energized and the armature has been moved into contact with the poles of the electromagnet, as will be explained hereinbelow. The retracted position is shown in Figure 3. The ferrule 34 has a small cap 37 screwed to a threaded projection thereof. The cap 37 thus serves to push the stem 33 of the armature 32 to the left when the ferrule is retracted. The cap 37 also serves to hold a valve disk 38 against the front face of the ferrule. The ferrule 34, the valve disk 38 and cap 37 therefore constitute a valve assembly or valve indicated generally at 39 which coacts with the valve seat 8. The stem 33 has a loose fit with the valve 39.

A movable cup-shaped member 40 constitutes a movable housing for a spring 41 and slidably telescopes the stationary cup-shaped housing 30 for the electromagnet. This slidable housing 40 is provided with an annular flange 42 at its rear end against which the arms 22 of the bifurcated bell crank lever 21 bear when the button 16 is depressed to thus retract the housing 40 and valve 39 and reset the device in valve open position. The spring 41 is preferably centered at its rear end by a cone-like member 43 surrounding the stem 33 and at its front end by means of a slight depression 44 formed in the ferrule 34.

The operation of the apparatus is as follows:

Normally the valve is in closed position as shown in Figure 1. If it is desired to open the valve or in other words to reset the valve, the operator presses downwardly on the thumb button 16 and thus rocks the bell crank lever 21. This causes the outer telescoping cup-shaped member or housing 40 to slide rearwardly over the housing 30 to the position shown in Figure 3 thus opening the valve. This places the armature 32 in contact with the pole tips of the electromagnet 28 and when the electromagnet is energized such armature will hold the valve in open position against the action of the closing spring, 41. As soon as the electromagnet is deenergized the closing spring 41 will close the valve.

It has been found by having the closing spring housed, the chances of gumming up the spring are greatly reduced or substantially entirely eliminated. Each time the device is manually reset the outer telescoping housing 40 will scrape the outer face of the inner housing 30 clear of any material that may have accumulated. It is to be noted that the power of the spring 41 is limited whereas the power that may be exerted on the thumb button 16 may be many times that of the spring 41. The spring 41 always has the utmost freedom of action as it is completely housed and the chances of gumming are almost negligible.

Further it will be seen that by having the ferrule 34 act not only in the capacity of loosely coupling the outer telescopic member 40 to the stem 33, but also act as part of the valve, the overall length of the device is greatly reduced. The valve 39, it is to be noted is loosely coupled to the rest of the apparatus and may freely seat on the valve seat 8. Further, the armature 32 in accordance with the usual practice is loosely coupled to its stem 33 and may squarely seat upon the pole faces of the electromagnet.

It is to be noted also that a large proportion of the parts are formed of stampings, the main body portion, its cover and the two telescopic members are stampings and are thus very cheaply produced. Further the frame 9 and the bell crank lever 21 are also formed of stampings. A large per cent of the remaining parts are merely screw machine products made from stock material. This construction therefore greatly reduces the total cost of the device.

It is to be distinctly understood that the expressions "upward" or "downward" or "top" or "bottom" are to be interpreted merely as illustrative and in no sense limiting since the device may be mounted in any position desired.

Although this invention has been described in considerable detail, it is to be understood that such description is intended as illustrative rather than limiting, as the invention may be variously embodied and is to be interpreted as claimed.

What is claimed is:

1. A compact safety valve device comprising a body portion having an inlet and an outlet provided with a valve seat, a stationary electromagnet, a movable armature and valve operatively connected, and a spring urging said armature away from said electromagnet and said valve towards closed position, a first cup-shaped housing held in a stationary manner within said body portion and enclosing said electromagnet and armature, a second and movable cup-shaped housing telescopic with respect to said first cup-shaped housing and operatively connected to said valve and housing said spring, said movable cup-shaped housing having a flange projecting outwardly therefrom, and manual means including a depressible member and a bell crank lever operated therefrom and having bifurcated arms arranged to engage said flange and move said telescopic movable cup-shaped housing inwardly with respect to said stationary cup-shaped housing to thereby withdraw said valve from said valve seat and move said armature into contact with the poles of said electromagnet, said crank lever being located entirely between the extreme ends of said housings while said armature is in contact with the poles of said electromagnet to thereby provide a highly compact safety valve device.

2. A compact safety valve device comprising a body portion having an inlet and outlet provided with a valve seat, a stationary electromagnet, a movable armature and valve operatively connected, and a spring urging said armature away from said electromagnet and said valve towards closed positions, a first cup-shaped housing held in a stationary manner within said body portion and enclosing said electromagnet and armature, a second and movable cup-shaped housing telescopic with respect to said first cup-shaped housing and operatively connected to said valve and housing said spring, said movable cup-shaped housing having a flange projecting outwardly therefrom, manual means including a depressible member and a bell crank lever operated therefrom and having bifurcated arms arranged to engage said flange and move said telescopic movable cup-shaped housing to thereby withdraw said valve from said seat and move said armature into contact with the poles of said electromagnet, the bifurcated arms of said bell crank lever being arranged to loosely straddle said movable telescopic cup-shaped housing, said crank lever being located entirely between the extreme ends of said housings while said armature is in contact with the pole faces of said electromagnet to thereby provide a highly compact safety valve device, and spring means for returning said depressible member to its initial position.

3. A safety valve device comprising a stamped body portion having an open side and also having an inlet and an outlet provided with a valve seat, a stamped cover member for closing the open side of said body portion, and an electromagnetic valve assembly carried by said cover member located within said body portion when said cover member is affixed to said body portion, said valve assembly comprising a first cup-shaped housing carried by said cover member, an electromagnet and an armature located within said cup-shaped housing, a movable telescopic cup-shaped housing slidable over said first cup-shaped housing, a valve arranged to cooperate with said valve seat and mounted between said valve seat and said telescopic cup-shaped housing and operatively connected to said telescopic cup-shaped housing, a spring located within said movable telescopic cup-shaped housing and urging said valve toward closed position, and manual means also carried by said cover member located externally of said main body portion for moving said movable telescopic cup-shaped housing and said valve and said armature, whereby said armature may be placed in engagement with said electromagnet and said valve may be moved to open position, said spring being arranged to move said armature away from said electromagnet when the latter is deenergized and to move said valve to closed position.

4. In an electromagnetic safety valve device for controlling flow of fuel through a conduit to a fluid fuel burner and having a thermoelectric generator subject to the heat of said burner for energization of said device, in combination, a body portion having an open side and also having an inlet and outlet for connection to said conduit, said outlet having a valve seat, a cover member for closing the open side of said body portion, and an electromagnetic valve assembly carried by said cover member located within said body portion when said cover member is affixed to said body portion, whereby said valve assembly may be removed from said body portion by removal of said cover and without disturbance of said body portion with respect to said conduit, said valve assembly comprising a first cup-shaped housing carried by said cover member, an electromagnet and an armature located within said cup-shaped housing, a movable telescopic cup-shaped housing slidable over said first cup-shaped housing, a valve arranged to cooperate with said valve seat and mounted between said valve seat and said telescopic cup-shaped housing and operatively connected to said telescopic cup-shaped housing, a spring located within said movable telescopic cup-shaped housing and urging said valve toward closed position, and manual means also carried by said cover member located externally of said main body portion for moving said movable telescopic cup-shaped housing and said valve and said armature, whereby said armature may be placed in engagement with said electromagnet and said valve may be moved to open position, said spring being arranged to move said armature away from said electromagnet when the latter is deenergized and to move said valve to closed position.

5. A small compact safety valve device comprising, in combination, a valve body portion having an inlet and outlet with a valve seat therebetween, a small compact electromagnet housing within said valve body and having a stationary housing member and a movable housing member telescopic with respect to and about said stationary member, a valve member for cooperation with said valve seat connected to said movable housing member, an electromagnet positioned within said housing and connected to one of said housing members, an armature for cooperation with said electromagnet positioned within said housing and connected to the other of said housing members, biasing means within said housing urging said electromagnet and armature apart and said valve member into seating position with said valve seat, and resetting means operable externally of said valve body to move said movable housing member to unseat said valve member and to position said electromagnet and armature in attracted relative position, said resetting means comprising a lever located adjacent said housing and entirely between the ends thereof to thereby provide a small compact valve device.

6. A small compact safety valve device comprising, in combination, a valve body portion having an inlet and outlet with a valve seat therebetween, a small compact electromagnet housing within said valve body and having a stationary housing member and a movable housing member having a flanged open end telescopic with respect to and about said stationary member, a valve member for cooperation with said valve seat connected to said movable housing member, an electromagnet positioned within said housing and connected to one of said housing members, an armature for cooperation with said electromagnet positioned within said housing and connected to the other of said housing members, biasing means within said housing urging said electromagnet and armature apart and said valve member into seating position with said valve seat, and resetting means operable externally of said valve body to move said movable housing member to unseat said valve member and to position said electromagnet and armature in attracted relative position, said resetting means comprising a pivotal lever having bifurcated arms arranged on opposite sides of said movable member and coacting with the flanged open end thereof, said lever being located entirely between the ends of said housing to thereby provide a small compact valve device.

References Cited in the file of this patent

UNITED STATES PATENTS

| | | |
|---|---|---|
| 2,354,704 | Ray | Aug. 1, 1944 |
| 2,596,796 | Solovieff | May 13, 1952 |